United States Patent Office 3,536,439
Patented Oct. 27, 1970

3,536,439
HYDROPHOBIC POLYMER DYED WITH MONOAZO DYE
Hanswilli von Brachel, Offenbach am Main, and Dieter Cornelius, Darmstadt-Arheiligen, Germany, assignors to Cassella Farbwerke Mainkur Aktiengesellschaft, Frankfurt am Main-Fechenheim, Germany, a company of Germany
No Drawing. Continuation-in-part of application Ser. No. 640,839, May 24, 1967. This application Oct. 17, 1967, Ser. No. 675,783
Claims priority, application Germany, Oct. 26, 1966, C 40,521
Int. Cl. D06p 1/02
U.S. Cl. 8—41    2 Claims

ABSTRACT OF THE DISCLOSURE

Hydrophobic polymers are very effectively dyed and printed fast to light, wet processing and heat, in dye liquor or with printing pastes containing a suspended 2,6-dicyano - 4 - nitro-1-[4'-amino-2'-acylamino-phenylazo] benzene as defined below.

---

The present application is a continuation-in-part of application Ser. No. 640,839 filed May 24, 1967 and now abandoned.

We have found that synthetic hydrophobic materials, such as linear polyesters, cellulose acetate, polyamides and polycarbonates can be excellently dyed and printed by using water-insoluble monoazo dyes having the formula

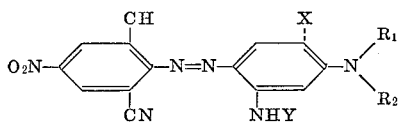

wherein X is hydrogen, alkyl having 1-4 carbon atoms or alkoxy having 1-4 carbon atoms; Y is acyl having up to 18 carbon atoms; and $R_1$ and $R_2$ stand for hydrogen, alkyl, aryl, aralkyl, hydroxyalkyl, acyloxyalkyl or cyanoalkyl and have not more than 12 carbon atoms each.

Conventional dyeing and printing processes customary for the foregoing hydrophobic materials give with the dyes of the present invention brilliant, blue, full dyeings and prints which have very good fastness properties, especially a very good fastness to light and wet processing as well as an excellent resistance to heat-treatment.

Filaments, films, and woven or knitted textile materials, such as fibers, threads and flocks can be so dyed.

Polycaprolactams, polycarbonates of bisphenol-A, cellulose triacetate and polyesters of terephthalic acid with ethylene glycol or with p-dimethylol cyclohexane, are easily dyed in accordance with the present invention at temperatures of 75–100° C., preferably 100° C., under normal pressure, or at temperatures up to 140° C. under an increased pressure, using conventional dyeing techniques. When working at temperatures in the neighborhood of 100° C. or below, it is advisable to add swelling agents (carriers) to the dyebath. As swelling agents there may be employed high boiling compounds, for example, aromatic hydrocarbons such as diphenyl, aromatic halogen compounds such as chloro benzenes, aromatic carboxylic acids such as benzoic acid and salicylic acid, phenols such as o- and p-phenyl phenols, and esters such as alkyl terephthalates. The dyestuffs may be fixed in the dyebath, or they can be fixed by dry-heat setting at temperatures from 200–230° C.

When the dyes of the present invention are applied by printing, fixation may be carried out by steaming the printed articles in the presence of a carrier at about 80–110° C. or without a carrier at about 110–140° C., or by treating them according to the so-called thermofixing process at about 170–230° C.

For a better understanding of the nature and objects of this invention, reference should be made to the accompanying examples which are of an illustrative rather than a limiting nature. Unless otherwise stated, all temperatures given are in degrees centigrade.

EXAMPLE 1

25 g. of a polyethyleneglycol terephthalate yarn are introduced into an aqueous dyebath at 50–60°, the pH-value of which is adjusted to 5.5 by acetic acid and which contains per liter of water 10 g. of o-phenyl phenol and 0.5 g. 2,6-dicyano-4-nitro-1-[4'-diethylamino-2'- acetylamino-phenylazo]-benzene in a finely dispersed form. Within 30 minutes the dyebath is heated to boiling and it is then kept boiling for 90 minutes. The material dyed in this way is aftertreated at 60–70° for 20–30 minutes in an aqueous reduction liquor containing 4 cc./l. caustic soda solution (38° Bé) and 2 g./l. sodium dithionite. Thereupon the yarn is rinsed in hot water acidified with acetic acid and finally rinsed again in plain water.

A bright, blue dyed product is obtained having very good fastness properties.

The monoazo dyestuff used in the above example may be prepared either by direct azo coupling or by reacting 2,6 - dibromo-4-nitro-1-[4'-diethylamino-2'-acetylamino-phenylazo]benzene or 2-cyano-4-nitro-6-bromo-1-[4'-diethylamino-2'-acetylamino-phenylazo] benzene with copper(I) cyanide in a neutral, aprotic, dipolar solvent, such as dimethyl sulfoxide, dimethyl formamide or N-methylpyrrolidinone, in the manner described in application Ser. No. 640,839 and now abandoned, particularly its Example 2. It melts at 249°, and it crystallizes from chlorobenzene.

EXAMPLE 2

25 g. of a polyethyleneglycol terephthalate yarn are introduced, at 50°, into an aqueous dyebath, which has its pH-value adjusted to 5 by phosphoric acid, and contains per liter of water 1 g. of lauryl sulfate, 0.5 g. 2,6-dicyano - 4 - nitro - 1-[4'-dimethylamino-2'-acetylamino-phenylazo] benzene in a finely dispersed form. This dyebath is then heated to 125–130° within 45 minutes and kept at this temperature for 90 minutes. The dyed yarn is now aftertreated as described in Example 1. A reddish blue dyeing is obtained having very good fastness properties. This dye is prepared by the same techniques described above for preparing its diethyl analog of Example 1. It melts at 262° and recrystallizes from dichloro benzene.

EXAMPLE 3

A woven polyethyleneglycol terephthalate fabric is padded at 40° with a padding liquor containing in 1 liter of water 2.5 g. of p-decylphenoxy octaethoxy ethanol, 20 g. of polyacrylic acid thickener and 2 g. 2,6-dicyano-4 - nitro - 1-[4'-diethylamino-2'-acetylamino-5'-methoxy-phenylazo] benzene in a finely dispersed form. The padded fabric is then dried and treated at 200–230° with hot air for 60 seconds, according to the so-called thermosol dyeing process. The dyed material is subjected to a reductive aftertreatment with an aqueous liquor containing 4 cc./l. caustic soda solution (38° Bé) and 2 g./l. sodium dithionite for 20 minutes at 60–70°, and then rinsed with water, acidified with water containing 20% acetic acid, and rinsed again with water.

A greenish blue dyeing is obtained having very good fastness properties. This dye is also made as above indicated, melts at 231–32° and recrystallizes from glacial acetic acid.

EXAMPLE 4

25 g. of a cellulose triacetate fabric are introduced at 60° into a dyebath prepared according to Example 2. The dyebath is heated to 125–130° within 45 minutes and kept at this temperature for 90 minutes.

The aftertreatment is carried out as described in Example 1. A blue dyeing is obtained.

EXAMPLE 5

25 g. of 2 mil thick cellulose acetate film (2½ acetate groups per hexose group) are brought at 40° into an aqueous dyebath containing per liter of water 1 g. of the dispersing agent of Example 2 and 0.5 g. of the finely dispersed dyestuff of Example 1, and having a pH-value adjusted with acetic acid to 6.5. The dyebath is then slowly heated to 75° and kept at this temperature for 60 minutes. The dyed film is rinsed first with cold water and then with hot water. A light blue dyeing is obtained.

EXAMPLE 6

25 g. of a nylon-6 polyamide fabric are introduced, at 30°, into a dyebath prepared according to Example 5. This dyebath is heated to boiling within 30 minutes, and is kept boiling for 60 minutes.

The dyed material is rinsed first with cold and then with hot water to leave a bright, blue dyed fabric.

EXAMPLE 7

A polyethyleneglycol fabric is printed on a roller printing machine with a printing paste containing per kilogram:

50 g. of a 10% paste of finely divided 2,6-dicyano-4-nitro - 1-[4'-diethylamino-2'-acetylamino-phenylazo]benzene, 250 g. of a thickener made from equal parts of starch and tragacanth, 250 g. alginate thickener (8% sodium alginate in water) and 450 g. of water.

After printing and drying, the fabric is fixed by passage for 30–60 seconds through a curing oven held at 190–210° or steamed for 10–20 minutes in steam at 1–2 atmospheres (gauge) pressure. In either case brilliant blue prints are obtained having a very good fastness to light and to dry-heat setting.

Similarly favorable results are obtained by using monoazo dyes prepared by coupling diazotized 2,6-dicyano-4-nitro aniline with the following:

3-acetylamino-N-phenethyl aniline
3-acetylamino-N-cyano-ethyl aniline
2-methoxy-5-acetylamino-N-cyano-ethyl aniline
3-acetylamino aniline
2-methoxy-5-acetylamino aniline
2-methyl-5-acetylamino aniline
3-acetylamino-N-hydroxy-ethyl aniline
2-methyl-5-acetylamino-N,N-diethyl aniline
2-ethoxy-5-acetylamino-N,N-diethyl aniline
2-methoxy-5-acetylamino-N,N-dimethyl aniline
3-formylamino-N,N-diethyl aniline
3-propionylamino-N,N-diethyl aniline
3-cyano-acetylamino-N,N-diethyl aniline
3-acetylamino-N-methyl-N-cyano-ethyl aniline
3-acetylamino-N-ethyl-N-cyano-ethyl aniline
3-acetylamino-N-phenethyl-N-cyano-ethyl aniline
3-acetylamino-N-ethyl-N-hydroxy-ethyl aniline
3-acetylamino-N,N-di(hydroxy-ethyl) aniline
3-acetylamino-N,N-di(acetoxy-ethyl) aniline
3-acetylamino-N-cyano-ethyl-N-hydroxy-ethyl aniline
3-acetylamino-N-cyano-ethyl-N-acetoxy-ethyl aniline
2-methoxy-5-acetylamino-N-ethyl-N-cyano-ethyl aniline
2-methoxy-5-acetylamino-N-hydroxy-ethyl-N-cyano-ethyl aniline
2-methoxy-5-acetylamino-N,N-di(hydroxy-ethyl) aniline
2-methoxy-5-acetylamino-N,N-di(acetoxy-ethyl) aniline
2-ethoxy-5-acetylamino-N-ethyl-N-cyano-ethyl aniline
2-ethoxy-5-acetylamino-N-hydroxy-ethyl-N-cyano-ethyl aniline
2-ethoxy-5-acetylamino-N,N-di(hydroxy-ethyl) aniline
2-ethoxy-5-acetylamino-N,N-di(acetoxy-ethyl) aniline
2-methyl-5-acetylamino-N-ethyl-N-cyano-ethyl aniline
2-methyl-5-acetylamino-N-hydroxy-ethyl-N-cyano-ethyl aniline
2-methyl-5-acetylamino-N,N-di(hydroxy-ethyl) aniline
2-methyl-5-acetylamino-N,N-di(acetoxy-ethyl) aniline It will be understood that this invention is susceptible to further modification and, accordingly, it is desired to comprehend such modifications within this invention.

We claim:

1. A hydrophobic polymer selected from the group consisting of cellulose acetate, polyamides, polycarbonates and linear polyesters and dyed with a monoazo dye of the formula

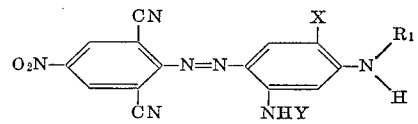

wherein X is hydrogen, alkyl having 1 to 4 carbon atoms or alkoxy having 1 to 4 carbon atoms; Y is formyl, acetyl, or propionyl and $R_1$ is hydrogen, methyl, ethyl, phenethyl, cyano-ethyl, hydroxy-ethyl or acetoxy-ethyl.

2. The dyed hydrophobic polymer of claim 1 wherein said polymer is in the form of a filament, film, fiber, thread or flock.

References Cited

UNITED STATES PATENTS 3,122,410  2/1964  Mueller et al. _____ 8—41

GEORGE F. LESMES, Primary Examiner

U.S. Cl. X.R.

8—50, 162, 178, 179